(12) United States Patent
Liu et al.

(10) Patent No.: US 6,710,293 B2
(45) Date of Patent: Mar. 23, 2004

(54) SYSTEM FOR AND METHOD OF CUSTOM MICROFILTER DESIGN WITH BEAMSPLITTER CHARACTERIZATION

(75) Inventors: Xinbing Liu, Acton, MA (US); Chen-Hsiung Cheng, Chelmsford, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/266,989

(22) Filed: Oct. 8, 2002

(65) Prior Publication Data

US 2004/0016732 A1 Jan. 29, 2004

Related U.S. Application Data

(60) Provisional application No. 60/398,400, filed on Jul. 25, 2002.

(51) Int. Cl.[7] .................. B23K 26/067; B23K 26/38
(52) U.S. Cl. .................. 219/121.73; 219/121.61; 219/121.7; 219/121.71; 219/121.77; 219/121.83; 700/166

(58) Field of Search .................. 219/121.61, 121.7, 219/121.71, 121.73, 121.76, 121.77, 121.83; 700/166; 347/47

(56) References Cited

U.S. PATENT DOCUMENTS

| | | | |
|---|---|---|---|
| 6,433,303 B1 * | 8/2002 | Liu et al. .................. | 219/121.7 |
| 6,605,796 B2 * | 8/2003 | Brandinger et al. | |
| 2001/0009251 A1 * | 7/2001 | Sekizawa et al. ...... | 219/121.73 |
| 2003/0102291 A1 * | 6/2003 | Liu et al. .................. | 219/121.73 |

* cited by examiner

*Primary Examiner*—Geoffrey S. Evans
(74) *Attorney, Agent, or Firm*—Harness, Dickey & Pierce, PLC

(57) ABSTRACT

A microfilter design system for use with a laser drilling system producing multiple sub-beams for parallel drilling operations includes an optical intensity detector illuminated by the multiple sub-beams of the laser drilling system. An analysis module operates the optical intensity detector to produce intensity measurement data for each of the multiple sub-beams. A memory operable with a data processing system stores the intensity measurement data for analysis.

34 Claims, 6 Drawing Sheets

SYSTEM FOR AND METHOD OF CUSTOM MICROFILTER DESIGN WITH BEAMSPLITTER CHARACTERIZATION

CROSS-REFERENCE TO RELATED APPLICATIONS

This application claims the benefit of U.S. Provisional Application Ser. No. 60/398,400 which was filed on Jul. 25, 2002 and is incorporated by reference herein.

FIELD OF THE INVENTION

The present invention generally relates to laser drilling and particularly relates to microfilter design for laser drilling systems producing multiple sub-beams for parallel drilling operations.

BACKGROUND OF THE INVENTION

Material ablation by pulsed light sources has been studied since the invention of the laser. Etching of polymers by ultraviolet (UV) excimer laser radiation in the early 1980s led to further investigations and developments in micromachining approaches using lasers—spurred by the remarkably small features that can be drilled, milled, and replicated through the use of lasers. A recent article entitled "Precise drilling with short pulsed lasers" (X. Chen and F. Tomoo, High Power Lasers in Manufacturing, Proceedings of the SPIE Vol. 3888, 2000) outlines a number of key considerations in micromachining. Other recent patents of interest include the following:

U.S. Pat. No. 6,252,714, "Diffractive homogenizer with compensation for spatial coherence," describes a diffractive homogenizer for receiving a beam of laser energy and producing a desired illumination pattern in a target plane. The homogenizer is made up of a plurality of diffractive sub-elements, each of which contributes to all or a portion of the desired image. By combining the contributions of many sub-elements to form the final image, a homogenizing effect is realized. In preferred embodiments, the sub-elements are designed to compensate for the finite spatial coherence of the incident laser beam and to control the numerical aperture distribution of the transmitted light. Each sub-element is composed of a large number of discrete pixels, each of which alters the phase of radiation passing therethrough by a selected amount. The pixel arrangement is chosen; using computer modeling and optimization techniques, such that the interference pattern created by the collective pixels in a sub-element makes up the desired image (or a portion thereof). A technique is also provided for reducing the intensity of the image formed by a selected sub-element, which may be located in a laser "hot spot", by randomizing a selected percentage of the pixels located in that sub-element. This diffractive homogenizer is useful in various laser ablation and annealing, and other laser material processing applications.

U.S. Pat. No. 6,243,209, "Method and apparatus for providing rectangular shape array of light beams," describes a linear array of equal intensity optical beams transformed into a rectangular array of equal intensity optical beams, while the intensity of each beam is kept nearly constant. The transformation is performed using an optical element that has two coatings on the front surface and a reflective coating on the opposing back surface. The front surface is partially coated with a reflective coating and partially coated with an anti-reflective coating. The beams are incident upon the front surface, with some of the beams incident on each of the two different coatings on the front surface. The beams incident on the front surface are specularly reflected. The remaining beams are transmitted through the optical element to the back surface, reflected from the back surface, and transmitted back up through the optical element and exit from the front surface. The exiting beams are thus shifted laterally and transversely to define the desired rectangular array. The index of refraction, thickness of the optical element, and the incident angle of the beam are selected to achieve the desired arrangement of beams.

U.S. Pat. No. 6,236,509, "Diffractive optical system with synthetic opening and laser cutting device incorporating this system," describes an optical device for focusing a light beam. The device includes a Fourier diffractive element that can separate an incident beam into n beams along n directions that are symmetric about an optical axis. The device also includes a diffractive element including a Fresnel lenses capable of refocusing the n beams onto the optical axis. The device may be used with lasers and laser cutting devices.

U.S. Pat. No. 6,025,938, "Beam homogenizer," describes a beam homogenizer that minimizes undesired intensity variations at the output plane caused by sharp breaks between facets in previous embodiments. The homogenizer includes a hologram made up of irregularly patterned diffractive fringes. An input beam illuminates at least part of the hologram. The hologram transmits a portion of the input beam onto an output plane. In doing so, the energy of the input beam is spatially redistributed at the output plane into a homogenized output beam having a pre-selected spatial energy distribution at the output plane. Thus, the illuminated portion of the output plane has a shape predetermined by the designer of the homogenizer.

U.S. Pat. No. 5,566,024, "Beam separation control and beam splitting by single blazed binary diffraction optical element," describes two sets of two single blazed binary diffractive optical elements that form a beam separation control apparatus for expanding two closely spaced parallel beams into two wider spaced parallel beams or for contracting two wider spaced parallel beams into two closely spaced parallel beams. Four sets of two single blazed binary diffractive optical elements form a beam separation control apparatus for separating two closely spaced parallel beams into two wider spaced parallel beams for possible modulation or other optical effect, then returning the two beams to be closely spaced and parallel. A set of two adjacent and opposite single blazed binary diffractive optical elements can form a beam splitting apparatus or a beam combining apparatus.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). Along with a wide variety of potential applications for ultrafast and short pulse lasers in medicine, chemistry, and communications, short pulse lasers are also useful in milling or drilling holes in a wide range of materials. In this regard, hole sizes in the sub-micron range are readily drilled by these lasers. High aspect ratio holes are also drilled in hard materials; applications in this regard include cooling channels in turbine blades, nozzles in ink-jet printers, and via holes in printed circuit boards.

Parallel processing of laser-milled holes is a key technique for increasing throughput in laser micromachining. Beamsplitting devices (beamsplitters) such as diffractive optical elements (DOEs) are used in laser micromachining to divide a single beam into multiple beams and thereby achieve parallel machining. However, such use of beamsplitters introduces technical challenges in hole geometry requirements and in the ability to produce consistent results. Such challenges need to be overcome in order to maintain consistency and repeatability in laser milling.

Inkjet nozzle design, construction, and operation are all important factors in providing high quality inkjet print resolution. Inkjet nozzle designs, which typically include specific patterns of many ink jet holes, which in turn are also specific defined geometries, provide the templates for nozzle holes drilled in a thin foil or polymer to a particular shape. Each nozzle hole includes an input section, a shaped section and an exit hole section, and each exit hole section is preferably cut with a high degree of precision respective to the design pattern. In a particular nozzle inconsistency in nozzle hole shape leads to inconsistent expulsion of inks among the individual holes in an inkjet nozzle, which negatively affects print resolution. Therefore, imperfections in the shape of the inkjet nozzle holes respective to the design pattern negatively impact print quality.

When a DOE is used to produce multiple sub-beams for parallel machining, generally there is variation in beam strengths among the sub-beams, i.e., some sub-beams are more intense than the average sub-beam strength and some are weaker than the average sub-beam strength. The variation is caused by the design and/or fabrication imperfections of the DOE. The beam strength variation among the sub-beams leads to size variations among the machined geometries. Stronger sub-beams tend to machine larger sizes. If the beam strength variation is too large that the machined geometries exceed the product specification, and thus means must be found to reduce the beam strength variation among the sub-beams of the DOE.

Microfilters are used in equalizing sub-beam intensities to enable a parallel process laser drilling system to drill consistent workpiece geometries. One important application for such a use is in inkjet nozzle hole manufacture. However, the respective microfilter is also subject to factors derived from manufacturing errors and design limitations. In this regard, microfilters do not, as delivered, predictably sufficiently equalize the intensities of sub-beams in parallel process laser drilling systems because the microfilters are designed with inaccurate sub-beam intensity data. This data is inaccurate insofar as it is theoretical as based on design inputs of the beamsplitter, rather than being based on empirical measurements of actual sub-beam intensities. Current technology does not provide a way to empirically measure the intensities of subs beams to a level of accuracy acceptable for use in designing a microfilter for use in precision parallel laser drilling.

What is needed is a way to improve accuracy of measuring relative beam intensities in parallel process laser drilling system so that the design input parameters for microfilter design will be more accurate and so that microfilter designs and the resultant microfilters will improve to provide sufficiently balanced and homogeneous parallel subbeams for consistent hole manufacture. The present invention provides a solution to this need.

SUMMARY OF THE INVENTION

According to the present invention, a microfilter design system for use with a laser drilling system producing multiple sub-beams for parallel. drilling operations includes an optical intensity detector illuminated by the multiple sub-beams of the laser drilling system. An analysis module operates the optical intensity detector to produce intensity measurement data for each of the multiple sub-beams. A memory operable with a data processing system stores the intensity measurement data for analysis.

The present invention provides a method for providing sub-beam impingement intensity control from a set of sub-beams generated from a parallel process laser system and impinged upon a target, where at least two of the sub-beams having an impingement separation at the target of less than about 260 microns by measuring the impingement intensity of each sub-beam to generate a sub-beam intensity measurement and attenuating the intensity of each sub-beam in response to the measurement.

In preferred form, the invention uses, in the measuring step, a scanning diode and blocking plate with an aperture positioned to pass the sub-beam whose intensity is being measured to a target point, while at the same time blocking all adjacent sub-beams from passing to impinge upon the target point being measured.

As should be readily appreciated, the invention also provides a laser cutting apparatus, such as used in manufacturing an inkjet nozzle, which uses a microfilter derived from the above steps.

A number of advantages are provided with the invention. By providing a way to improve the accuracy of measuring relative beam intensities in a parallel process laser drilling system, further derived benefits of improved microfilter design parameters and improved mirofilter design are readily realized. A solution approach is also achieved for compensating for fabrication errors and minor defects in diffractive optical elements. An approach is also derived for compensating for final intensity variations between sub-beams emitted from a diffractive optical element. Print resolution in inkjet printers is also realized when the inkjet nozzles of the printer are manufactured with the benefit of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In overview, one embodiment of the present invention provides a method of designing a microfilter to be used in a parallel process laser drilling system, including the steps of providing a parallel process laser drilling system that generates a plurality of sub-beams in a pre-defined pattern, measuring the strength of each individual sub-beam for subsequent analysis, analyzing the intensity data in order to determine appropriate design parameters for a customized microfilter, and designing and fabricating the customized microfilter according to these design parameters.

In another embodiment, a continuously scanning photodiode designed to empirically measure the intensities of all the sub-beams generated by a beamsplitter is employed in the measuring step. The photodiode scans the strength of the sub-beams generated by the beamsplitter at a constant rate of speed around the pattern of sub-beams, and a computer defines the pattern, stores the intensity data, and analyses the intensity data by normalizing the data against the intensity of the laser beam measured by a stationary photodiode.

In yet another embodiment, each sub-beam is measured through an aperture in front of an intensity detector, and the intensities of a statistically significant sample of laser beam pulses are measured by a scanning photodiode through all sub-beams in a workpiece drilling pattern.

In a further embodiment, a customized microfilter article is specifically designed from the measurements to equalize strength of its sub-beams within a parallel process laser drilling system.

In another embodiment, an inkjet nozzle article is produced by a laser drilling system having the customized microfilter.

Figure 1:
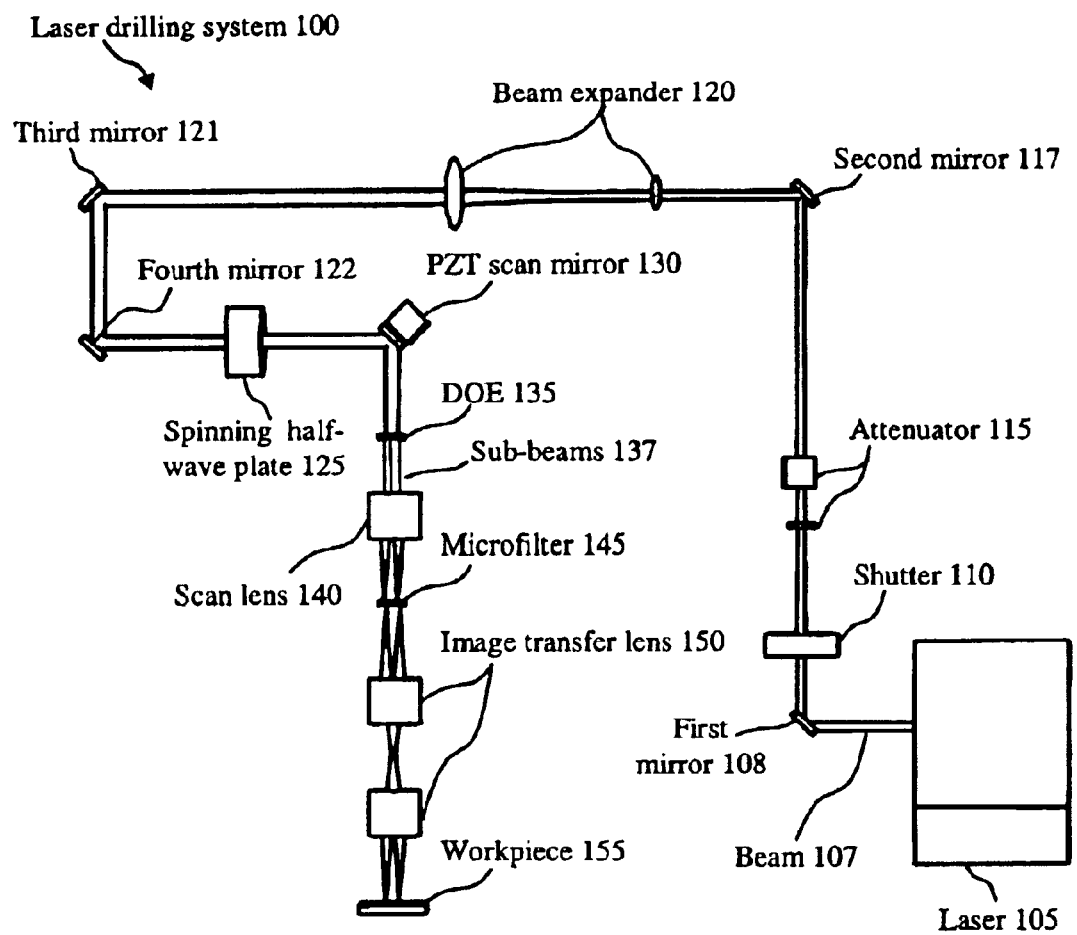
FIG. 1 presents a schematic of a laser drilling system.

Turning now to specific details in the preferred embodiments, FIG. 1 shows a simplified schematic of a laser drilling system 100, including a laser 105, a beam 107, a shutter 110, an attenuator 115, a beam expander 120, a spinning half-wave plate 125, a first mirror 108, a second mirror 117, a third mirror 121, a fourth mirror 122, a piezo electric transducer (PZT) scan mirror 130, a diffractive optical element (DOE) 135, a plurality of sub-beams 137, a scan lens 140, a microfilter 145, an image transfer lens 150, and a workpiece 155, arranged as shown. All elements of laser drilling system 100 are conventional in laser micromachining. DOE 135 is a highly efficient beamsplitter and beam array pattern generator that allows laser drilling system 100 to drill parallel holes in workpiece 155.

The pattern of sub-beams 137 output by DOE 135 is pre-determined by the specifications of the holes to be drilled in workpiece 155. In an alternate contemplated embodiment pursuant to anticipated improvements in beam quality of excimer lasers, an excimer laser with a kinoform is used in place of DOE 135. In one example, DOE 135 splits the single incident laser beam 107 from laser 105 into 152 beams in the form of 4 rows with 38 beams in each row. (The excimer/kinoform information is from Holmer and Hard's 1995 paper "Laser-machining experiment with an excimer laser and a kinoform" in Applied Optics which is hereby incorporated by reference herein).

Scan lens 140 determines the spot size of sub-beams 137 upon workpiece 155. The beam size that enters scan lens 140 must be less than or equal to the pupil size of scan lens 140. Telecentricity is required to keep the incident angle between sub-beams 137 and workpiece 155 perpendicular, which is necessary to drill parallel holes in workpiece 155. In the present invention, scan lens 140 is an f-theta telecentric (scan) lens. In alternate embodiments where the axes of the holes do not need to be parallel to each other, a non-telecentric scan lens is used.

Microfilter 145 equalizes the uniformity of sub-beams 137 emitted from laser 105 and through DOE 135. Microfilter 145 consists of dielectric coatings on a glass substrate, and is custom designed and fabricated according to the intensity patterns of sub-beams 137 of DOE 135. In one example, microfilter 145 consists of two transmission values, 100% and 98%, in a pattern of 152 individual filters of 4 rows with 38 filters in each row that corresponds to the example given to DOE 135 above. In this example, each of the individual filters is circular in shape with a diameter of 250 microns.

In operation, laser 105 emits beam 107 along the optical path identified in FIG. 1 above. Beam 107 propagates along the optical path, where it is incident upon first mirror 108. First mirror 108 redirects beam 107 along the optical path, where it is incident upon shutter 110. Shutter 110 opens and closes to selectively illuminate the material of workpiece 155. Beam 107 exits shutter 110 and propagates along the optical path to attenuator 115. Attenuator 115 filters the energy of laser 105 in order to precisely control ablation parameters. Beam 107 exits attenuator 115 and propagates along the optical path, where it is incident upon second mirror 117. Second mirror 117 redirects beam 107 along the optical path, where it is incident upon beam expander 120.

Beam expander 120 increases the size of beam 107 to match the pupil size of scan lens 140. Beam 107 exits beam expander 120 and propagates along the optical path, where it is incident upon third mirror 121. Third mirror 121 redirects beam 107 along the optical path, where it is incident upon fourth mirror 122. Fourth mirror 122 redirects beam 107 along the optical path, where it is incident upon spinning half-wave plate 125. Spinning half-wave plate 125 changes the polarization of beam 107. Upon exiting spinning half-wave plate 125, beam 107 propagates along the optical path, where it is incident upon PZT scan mirror 130. PZT scan mirror 130 moves in a pre-defined pattern using a drilling algorithm (which executes on computer such as computer 255—see FIG. 2) to drill the holes in workpiece 155. PZT scan mirror 130 redirects beam 107 along the optical path, where it is incident upon DOE 135. DOE 135 splits beam 107 into a plurality of sub-beams 137, which allow parallel drilling of workpiece 155. Sub-beams 137 exit DOE 135 and propagate along the optical path, where they are incident upon scan lens 140. Scan lens 140 determines the spot size of sub-beams 137 upon workpiece 155. Sub-beams 137 exit scan lens 140 and propagate along the optical path, where they are incident upon microfilter 145. Microfilter 145 equalizes the intensities of sub-beams 137. Sub-beams 137 exit microfilter 145 and propagate along the optical path, where they are incident upon image transfer lens 150. Image transfer lens 150 re-images the focal spots of sub-beams 137 onto workpiece 155. Sub-beams 137 ablate workpiece 155 in a pattern according to the pre-defined milling algorithm.

Beamsplitters such as DOE 135 generate sub-beams 137 that exhibit variable intensity distributions unacceptable for performing precision parallel process laser drilling. As will be further described, the present invention provides a way to compensate for these intensity variations in beamsplitters (e.g., DOE 135) by deriving a microfilter from empirically measured sub-beam intensities emitted from a specific beamsplitter.

Figure 2:
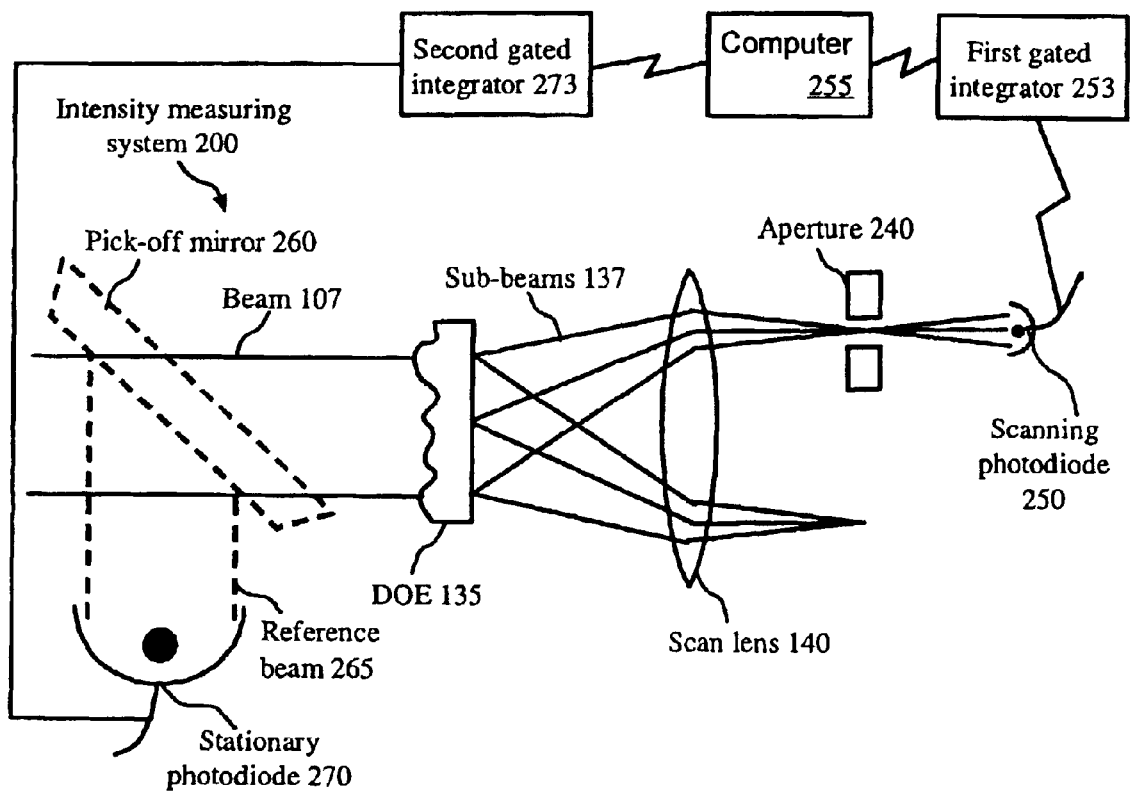
FIG. 2 shows an intensity measuring system used in designing a microfilter.

FIG. 2 shows an intensity measuring system 200 for designing microfilter 145, including: beam 107, DOE 135, sub-beams 137, scan lens 140, aperture 240 positioned in front of a scanning photodiode 250, first gated integrator 253, computer 255, pick-off mirror 260, reference beam 265, stationary photodiode 270, and second gated integrator 273.

Intensity measuring system 200 is used to design a customized microfilter (e.g., microfilter 145) to equalize the intensities of sub-beams 137 from a beamsplitter (e.g., DOE 135) within a specific parallel process laser drilling system. The resultant, customized microfilter 145 is designed to work within a specific laser drilling system to drill a specific pattern and workpiece geometry in a specific workpiece 155.

Beam 107, DOE 135, sub-beams 137, and scan lens 140 function as described above with respect to laser drilling system 100 in FIG. 1. Aperture 240 is a circular hole that allows sub-beams 137 to reach and be measured by scanning photodiode 250. Aperture 240 ensures that sub-beams 137 are incident upon the target area of scanning photodiode 250 such that scanning photodiode 250 measures beam strength individually. Accurate measurement of individual sub-beams 137 is not possible when more than one sub-beam 137 is incident upon scanning photodiode 250 simultaneously. To avoid this problem of more than one sub-beam 137 being incident upon scanning photodiode 250 at one time, the size of aperture 240 is defined by the spacing between the holes in the targeted workpiece geometry and the beam diameter at focus, such that only one sub-beam 137 is incident upon scanning photodiode 250 at a given time but the aperture 240 is large enough to transmit the whole sub-beam 137. In one example, with an 8×38-hole target pattern in an inkjet nozzle foil, the holes in the workpiece pattern are 250 microns apart and aperture 240 is circular with a diameter of 100 microns to minimize the possibility of more than one sub-beam being measured by scanning photodiode 250 at once.

Scanning photodiode 250 is a low-noise, high dynamic range photodiode, such as those manufactured by Thorlabs, Inc. The opto-electronic response of photodiode 250 needs to be frequency-adequate. In one example, silicon photodiodes only respond to light of 185–1100 nm. Backward bias and low impedance are used to obtain high speed measurments. Scanning photodiode 250 is placed beyond the focal plane where sub-beams 137 diverge slightly, such that the strength is lower than in the focal plane. The signal-to-noise ratio is maximized by using the largest possible photodiode under full illumination with a response time that meets the particular requirements of the sub-beams 137 under measurement. The response time sets an accompanying limit on noise reduction when time-gating technique is used in the measurement. In one example where measuring laser 105 pulses at a repetition rate of 1 kHz, a millisecond is the allowable time for scanning photodiode 250 to measure and log the strength of a single sub-beam 137 pulse before the subsequent pulse is incident upon scanning photodiode 250. In this same example, scanning photodiode 250 is a 1-mm square photodiode with a response time of less than 1 nanosecond into an impedance of 50 ohm.

Scanning photodiode 250 linearly responds to the strength of sub-beams 137 and sends an electrical pulse to first gated integrator 253. A log file is stored on computer 255 with all the measured pulses of sub-beam 137 for intensity analysis to be performed after all sub-beams 137 have been measured. In one example measuring an 8×38 pattern, scanning photodiode 250 takes approximately two hours to complete measuring all of sub-beams 137 in the pattern. In this example, it takes two hours to scan through the pattern, measuring a statistically significant sample of pulses from all sub-beams 137 in the pattern. In the same example, scanning photodiode 250 and aperture 240 move through the pattern one row at a time and one sub-beam after another sequentially in each row. The scanning speed is chosen such that a sufficient amount of data is collected from each sub-beam 137. The moving path is predetermined according to the pattern geometry of sub-beams 137.

First gated integrator 253 and second gated integrator 273 integrate the pulse with a rolling average for a fixed number of pulses to determine the strength of sub-beams 137 and reference beam 265 respectively. First gated integrator 253 sends an analog signal with strength proportional to the strength of sub-beam 137 to computer 255. Second gated integrator 273 sends an analog signal with strength proportional to the strength of reference beam 265 to computer 255. First gated integrator 253 and second gated integrator 273 transfer pulsed input signal to a quasi-continuous output that is captured by computer 255. In alternate embodiments, first gated integrator 253 and second gated integrator 273 are not required when a quasi-continuous laser is used for the measurement.

Computer 255 is a computer with a connection to scanning photodiode 250. Computer 255 contains an analog-to-digital converter to convert the level of analog signal from both gated integrator 253 and 273 to digital data. Computer 255 defines the scanning path of scanning photodiode 250, stores intensity data of all scanned sub-beams 137 for subsequent analysis, and provides a means for subsequent analysis.

Pick-off mirror 260 reflects a portion of beam 107, creating reference beam 265. One side of pick-off mirror 260 is coated with anti-reflection coating to avoid beam interference.

Reference beam 265 is reflected from pick-off mirror 260 and is incident upon stationary photodiode 270. Stationary photodiode 270 measures the beam strength of reference beam 265 and sends the intensity data to second gated integrator 273. The physical specification of stationary photodiode 270 is the same as that of the scanning photodiode 250. However, stationary photodiode 270 only measures the relative temporal variation; therefore, spatial mapping of reference beam 265 and the active area of stationary photodiode 270 are not required. The beam strength of reference beam 265 is used as a reference to mathematically compensate for any beam strength fluctuations occurring during the time scanning photodiode 250 measures all sub-beams 137.

In operation, beam 107 propagates along the optical path of a parallel process laser drilling system and is incident upon pick-off mirror 260. A portion of beam 107 is reflected by pick-off mirror 260 as reference beam 265 towards stationary photodiode 270. Stationary photodiode 270 measures the strength of reference beam 265 for use in compensating for strength variation in beam 107 over time. Data captured by stationary photodiode 270 is sent to computer 255 through gated integrator 273. The remaining portion of beam 107 not reflected by pick-off mirror 260 continues along the optical path until it is incident upon DOE 135. DOE 135 splits beam 107 into a plurality of sub-beams 137, which allow parallel drilling of workpiece 155. Sub-beams 137 exit DOE 135 and propagate along the optical path, where they are incident upon scan lens 140. Scan lens 140 determines the spot size of sub-beams 137 upon workpiece 155. Sub-beams 137 exit scan lens 140 and propagate along the optical path, where they pass through aperture 240 and are incident upon scanning photodiode 250. Scanning photodiode 250, mounted with aperture 240, moves according to a pre-defined pattern stored on computer 255 in order to sequentially scan all sub-beams 137. Scanning photodiode 250 measures the strength of a sample of pulses from each sub-beam 13 and sends the data to first gated integrator 253. First gated integrator 253 sends the data to computer 255.

The intensity data are stored on computer 255 for subsequent analysis and use in designing microfilter 145.

Figure 3:
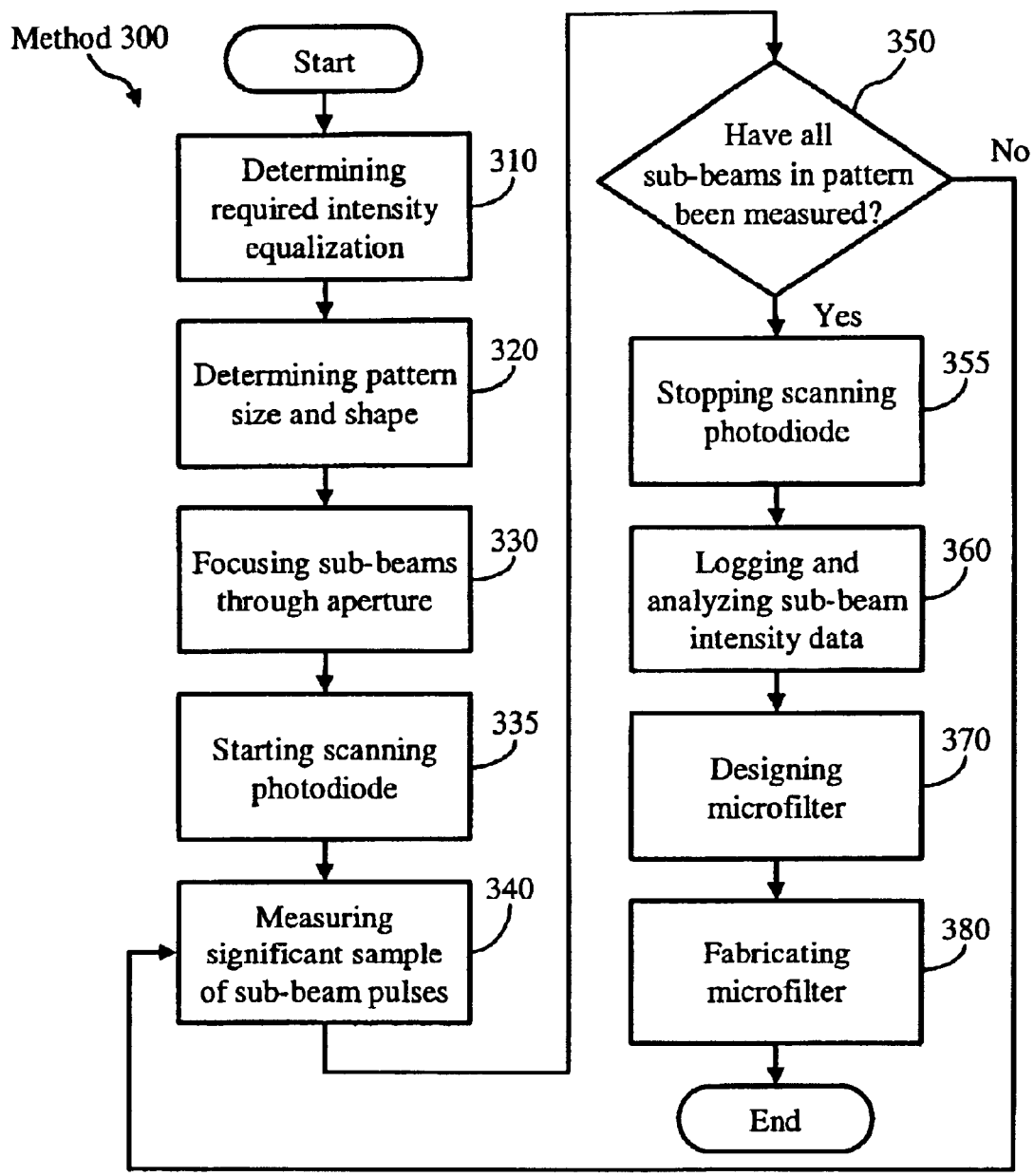
FIG. 3 shows a method of designing a microfilter using the intensity measuring system of FIG. 2.

FIG. 3 shows a method 300 of designing microfilter 145 using intensity measuring system 200 to provide the requisite accurate empirical data, including the steps below.

Steps 310 through 360 provide a detailed description of how intensity distribution information of sub-beams 137 is determined for the design and manufacture of microfilter 145.

In Step 310, determining required intensity equalization, a laser system operator or technician determines the intensity equalization of sub-beams 137 for producing a workpiece 155 that meets specifications. The relationship between the variation in the strength of sub-beams 137 and the variation in the desired workpiece geometry is experimentally established prior to the start of method 300. Based on this relationship, the laser system operator or technician determines an acceptable tolerance in the variation of the intensities of sub-beams 137, based on pre-determined experimental measurements.

In Step 320, determining pattern size and shape, the laser system operator or technician determines the pattern of sub-beams 137 to match the requirements of the desired product. In one example, an inkjet nozzle with 8 rows of 38 holes is to be drilled, requiring an 8×38 pattern to be determined. In alternate embodiments, other patterns may be used, as determined by product specifications.

In Step 330, focusing sub-beams through aperture, the assembly of aperture 240 and scanning photodiode 250 is placed in front of the sub-beam 137 such that aperture 240 is in the focal plane of sub-beams 137. This focuses sub-beams 137 through aperture 240 in front of scanning photodiode 250.

In Step 335, starting scanning photodiode, scanning photodiode 250 measures the strength of all sub-beams 137 by following a pre-determined scanning path.

In Step 340, measuring significant sample of sub-beam pulses, scanning photodiode 250 moves through the pre-determined scanning path at a constant rate of speed to capture a statistically significant sample of light pulses from a sub-beam 137 to ensure that the measurement uncertainty fits within the tolerances defined in step 310. Stationary photodiode 260 also measures the strength of reference beam 265 simultaneously. In one example of using laser drilling system 100, scanning photodiode 250 and stationary photodiode 270 capture about 2500 pulses of one sub-beam 137 as the scanning photodiode 250 moves across that sub-beam 137. Widely understood techniques of gating and background subtraction are used with first gated integrator 253 and second gated integrator 273 to measure and produce log files of the intensities of sub-beams 137 and reference beam 265, respectively. In the above example, a gating technique is used to selectively measure the output of photodiodes 250 and 270 when short pulses are present. Gating eliminates measurements taken when sub-beam 137 pulses were not incident upon scanning photodiode 250, preventing these measurements (containing only noise) from use in the design of microfilter 145. A rolling average over 30 pulses is also used to reduce the effect of noise on the laser pulses within the gated windows. This averaging technique also reduces measurement uncertainty (or standard deviation) statistically. Log files containing sub-beam identifiers and intensity data (along with the reference beam data) are stored on a computer (not shown) to be analyzed later in method 300.

In Step 350, decision respective to all sub-beams in pattern having been measured, it is determined whether scanning photodiode 250 has measured the strength of all sub-beams 137. If so, method 300 proceeds to step 355; if not, method 300 returns to step 340.

In Step 355, stopping scanning photodiode, the assembly of scanning photodiode 250 and aperture 240 stops scanning, having reached the end of the pre-determined scanning path, and having measured the strength of all sub-beams 137.

In Step 360, logging and analyzing sub-beam intensity data, the laser system operator or technician analyzes the strength of sub-beams 137 to produce input parameters used to design a customized microfilter 145. Analysis of the intensities of sub-beams 137 is done by averaging the selected 500-pulse section around the center of the "plateau" area, subtracting the average "background" measurement (the intensity reading during the time between spots or "dark orders") and normalizing the result respective to the strength of reference beam 265. The strength of reference beam 265 is measured by stationary photodiode 270 at the same point in time as the intensity measurements of sub-beams 137 to mathematically remove any effect of strength variation in beam 105 during the time needed to complete method 300 as shown in FIG. 4.

Figure 4:
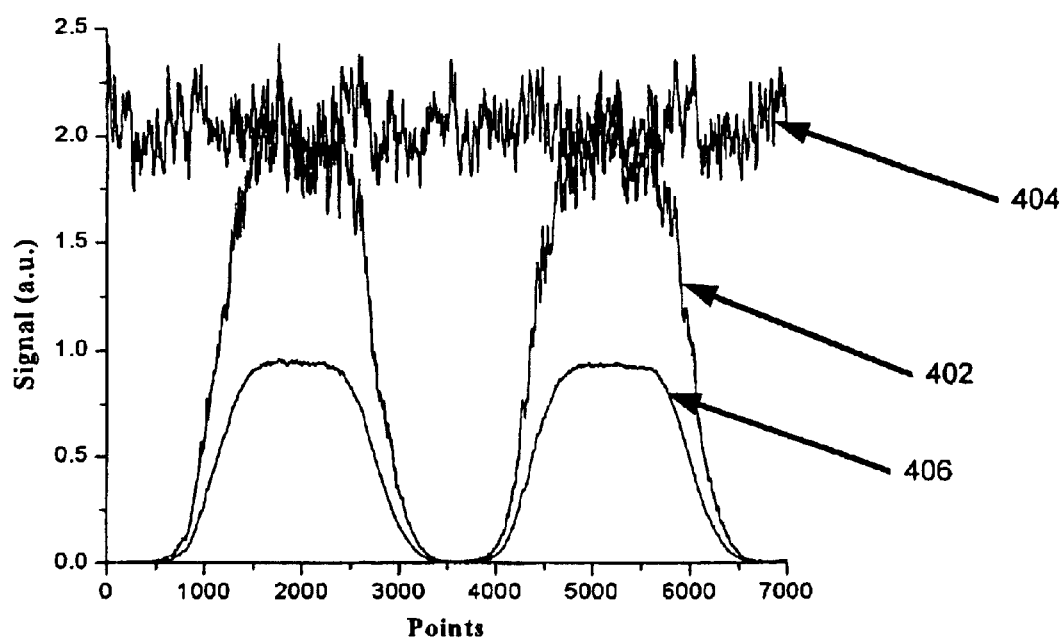
FIG. 4 shows a sample data plot of sub-beam data used in designing a microfilter in accordance with the present invention.

FIG. 4 shows a sample data plot of sub-beam data. In this sample, curve 402 is the strength measurement of sub-beam 137, curve 404 is the strength of reference beam 265, and curve 406 shows the normalized result. The two plateaus represent two of the 152 sub-beams measured. The resulting reduction in noise is clearly illustrated by the differential between the curves.

TABLE 1

| Point | Beam Intensity (B) | Average Background (D) | Reference Beam Intensity (R) | (B − D)/R |
|---|---|---|---|---|
| ... | ... | ... | ... | ... |
| 1963 | 1.843 | 0.007 | 1.950 | 0.9415 |
| 1964 | 1.804 | 0.007 | 1.918 | 0.9369 |
| ... | ... | ... | ... | ... |

Table 1 shows an example of the intensity analysis of sub-beams 137 taken from a picosecond laser drilling system (e.g. laser drilling system 100). Table 1 includes the intensity measurements from scanning photodiode 250 and the background level, the corresponding reference beam strength from stationary photodiode 270, and the normalized result of the actual strength per each data point. The last column constitutes curve 406 in FIG. 4. In the above example, a rolling-average routine is used to transfer plateau shape of transmission curve to peak shape curve. A peak-finder routine thus is applied to find the center of each peak that is also the center of the "plateau" in curve 406 of FIG. 4. The 500-pulse average around the plateau center further statistically reduces the uncertainty associated with the measurement by about another factor of 22. Each plateau is assigned a sub-beam ID and the beam strength is recorded as shown in Table 2.

TABLE 2

| Sub-beam ID | Average "Bright Order" Intensity |
|---|---|
| 1 | 0.9435 |
| 2 | 0.9872 |
| ... | ... |

In Step 370, designing microfilter, the laser system operator or technician uses the empirically measured sub-beam 137 intensity data resulting from step 360 to design a customized microfilter 145. The concepts of microfilter design are not discussed in detail here but should be apparent to those of skill in this art. In one example, each sub-beam 137 is matched with an individual filter with a transmission factor of the reciprocal of intensity within customized microfilter 145 to equalize the strength of sunbeams 137 before they are incident upon workpiece 155.

In Step 380, fabricating microfilter, a manufacturer fabricates microfilter 145 via conventional methods. The design established in step 370 provides the manufacturing specifications for producing a microfilter with the proper apertures and coatings to meet the design needs.

In summary, a high-level design process includes the following four steps. The first step is providing a parallel-process laser drilling system that generates a plurality of sub-beams 137 in a pre-defined pattern. The second step is measuring the strength of each individual sub-beam 137 for subsequent analysis. The third step is analyzing the intensity data of each sub-beam 137 in order to determine appropriate design parameters for a customized microfilter. The fourth step is designing and fabricating customized microfilter 145 according to these design parameters.

The system and method of the present invention are used to make a customized microfilter article that is specifically designed to equalize strength of sub-beams within a parallel process laser drilling system.

The system and method of the present invention are also used to produce an inkjet nozzle article with improved workpiece geometry, uniformity, and repeatability via use of a customized microfilter article designed to equalize strength of sub-beams within a parallel process laser drilling system. In this regard, a nozzle plate of an ink-jet head may be constructed with the laser drilling system of the present invention as further detailed in FIGS. 5 and 6.

Figure 5:
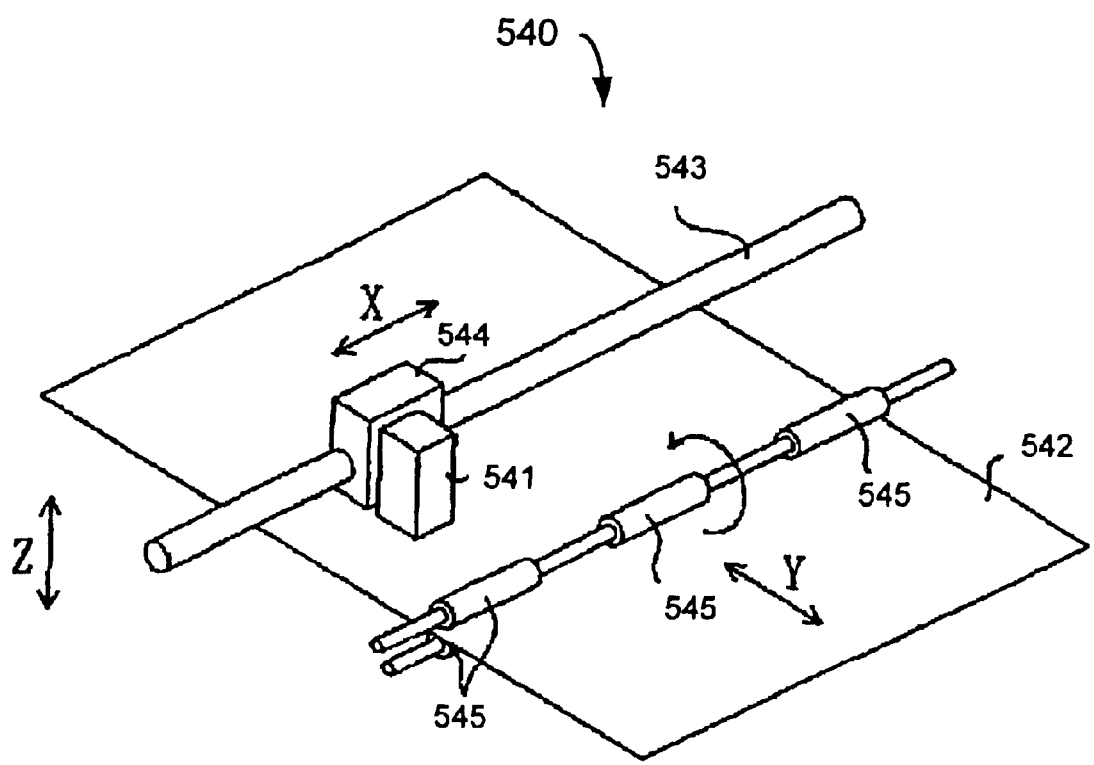
FIG. 5 provides a perspective view showing major constituent components of an ink-jet printer.

As shown in FIG. 5, an ink-jet printer 540 has an ink-jet head 541 capable of recording on a recording medium 542 via a pressure generator. Ink droplets emitted from ink-jet head 541 are deposited on the recording medium 542, such as a sheet of copy paper, so that recording can be performed on the recording medium 542.

The ink-jet head 541 is mounted on a carriage 544 capable of reciprocating movement along a carriage shaft 543. More specifically, the ink-jet head 541 is structured such that it can reciprocate in a primary scanning direction X in parallel with the carriage shaft 543. The recording medium 542 is timely conveyed by rollers 545 in a secondary scanning direction Y. The ink-jet head 541 and the recording medium 542 are relatively moved by the rollers 545.

Figure 6:
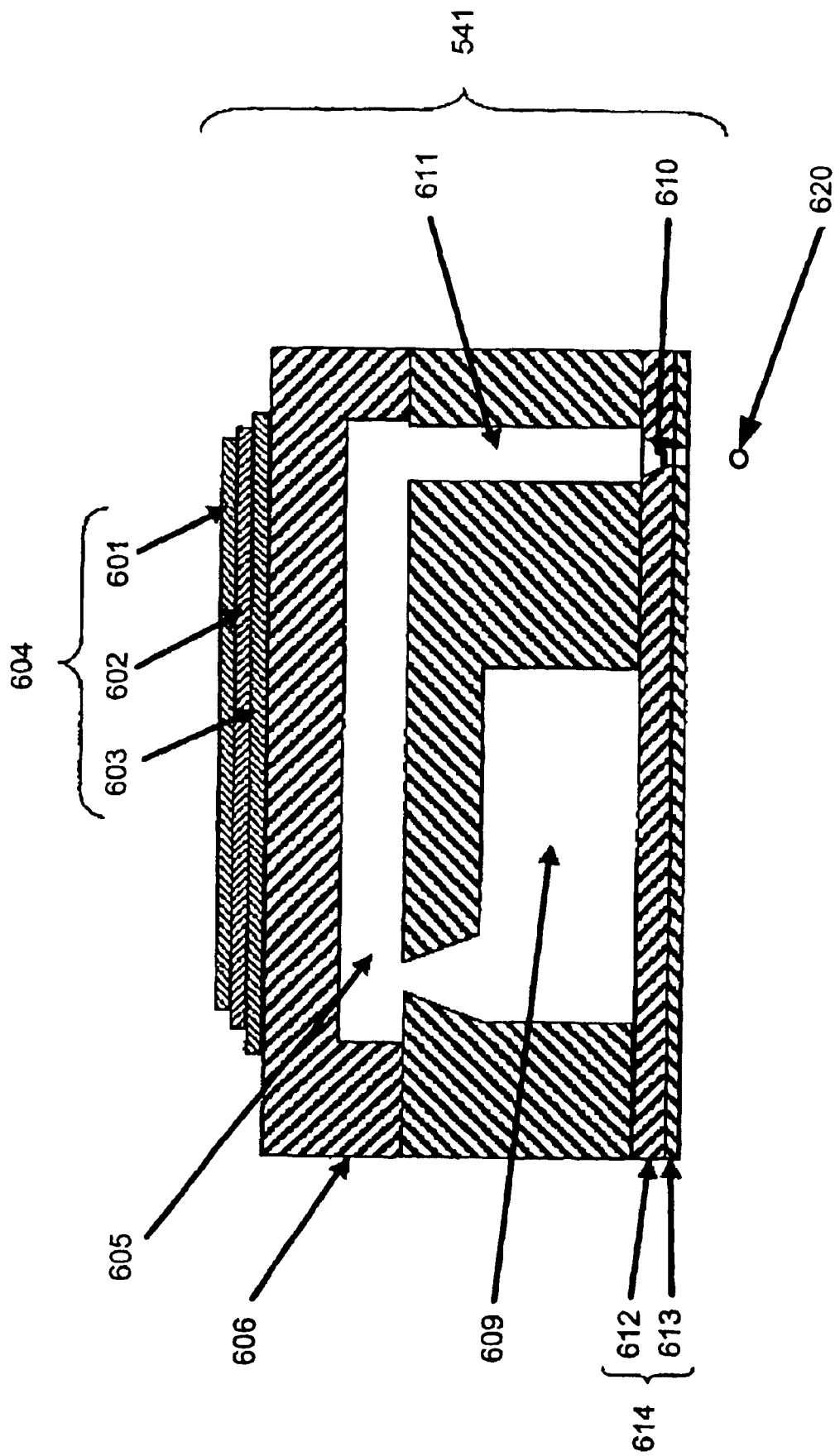
FIG. 6 provides a schematic, cross-sectional view of an inkjet head.

Turning now to FIG. 6, further details in inlet head 541 are shown. Pressure generator 604 is preferably a piezoelectric system, a thermal system, and/or equivalent system. In this embodiment, the pressure generator 604 corresponds to a piezoelectric system which comprises an upper electrode 601, a piezoelectric element 602, and an under electrode 603.

A nozzle plate 614 (an instance of workpiece 155) comprises a nozzle substrate 612 and a water repellent layer 613. The nozzle substrate 612 is made of metal, resin and/or equivalent material. The water repellant layer is made of fluororesin or silicone resin. In this embodiment, the nozzle substrate 612 is made of stainless steel and has a thickness of 50 um, and the water repellent layer is made of a fluororesin and has a thickness of 0.1 um.

The ink-jet ink is filled in an ink supplying passage 609, a pressure chamber 605, an ink passage 611, a nozzle 610. Ink droplets 620 are ejected from nozzle 610 as pressure generator 604 pushes on pressure chamber element 606.

As a result f the present invention, very good nozzles are formed without flash and foreign matter (carbon etc) in the nozzle plate. Further, the accuracy of the nozzle outlet diameter is 20 um±1.5 um (a preferred predefined acceptable threshold value for tolerance between the perimeter and the excision edge of the 20 um diameter nozzle outlet).

From the foregoing it will be understood that the present invention provides a system and method for cutting a workpiece with a laser cutting tool with a high degree of precision in the quality of the conformance of the dimensions of the removed portion to the dimensions of the design used in the cutting operation with special value in using a laser to mill exit holes in inkjet nozzles. While the invention has been described in its presently preferred form, it will be understood that the invention is capable of certain modification without departing from the spirit of the invention as set forth in the appended claims.

What is claimed is:

1. A microfilter design system for use with a laser drilling system producing multiple sub-beams for parallel drilling operations; comprising:
    an optical intensity detector illuminated by the multiple sub-beams of the laser drilling system;
    an analysis module operating said optical intensity detector to produce intensity measurement data for each of the multiple sub-beams; and
    a memory operable with a data processing system and storing the intensity measurement data for analysis.

2. The system of claim 1, wherein said optical intensity detector comprises a scanning photodiode having a mobile aperture blocking passage of all but one sub-beam, thereby permitting measurement of intensity of one sub-beam at a time.

3. The system of claim 2, comprising:
    a laser beam illuminating a beam splitter to produce the multiple sub-beams; and
    a pick-off mirror reflecting a reference beam measured by a stationary photodiode;
    wherein the intensity of the sub-beams generated by the beamsplitter are measured by the scanning photodiode, and normalized against the intensity of the laser beam measured by a stationary photodiode.

4. The system of claim 2 comprising:
    a scanning mechanism moving said scanning photodiode at a constant rate of speed around the pattern of sunbeams;
    a scan lens; and
    a pair of gated integrators to reduce effect of noise and convert signal for logging data in said memory,
    wherein said analysis module defines the scanning pattern, stores the intensity measurement data, and allows for intensity data analysis.

5. A method of designing a microfilter for use with a laser drilling system producing multiple sub-beams for parallel drilling operations, comprising:
    illuminating an optical intensity detector with the multiple sub-beams of the laser drilling system;
    measuring the intensities of each of the multiple sub-beams with the optical intensity detector; and
    designing a microfilter based on the measured intensities.

6. The method of claim 5, wherein said illuminating an optical intensity detector comprises illuminating a scanning photodiode.

7. The method of claim 6, wherein the scanning photodiode has a mobile aperture blocking passage of all but one sub-beam, thereby permitting measurement of intensity of one sub-beam at a time.

8. The method of claim 5 comprising providing a parallel process laser drilling system that generates the plurality of sub-beams in a pre-defined pattern.

9. The method of claim 5 comprising analyzing intensity data obtained in said measuring in order to determine appropriate design parameters for a customized microfilter.

10. The method of claim 5 comprising designing and fabricating a microfilter based on said designing.

11. A method for providing sub-beam impingement intensity control from a set of sub-beams generated from a parallel process laser system and impinged upon a target, at least two of said sub-beams having an impingement separation at said target of less than about 260 microns, comprising the step of:

independently attenuating the intensity of each sub-beam in said sub-beam set in response to a measurement of the impingement intensity of that sub-beam.

12. The method of claim 11 wherein said independently attenuating step is achieved with a microfilter.

13. The method of claim 12 wherein said measurement is used to make said microfilter.

14. The method of claim 11 wherein said sub-beam is passed through an aperture dimensioned to block all adjacent sub-beams from passing to impinge upon said target, said adjacent sub-beams being adjacent to the sub-beam whose intensity is being measured.

15. The method of claim 11 wherein said measurement further uses a reference beam intensity measurement.

16. The method of claim 11 wherein said measurement is derived from a set of statistically significant measurements of the intensity of said sub-beam, each measurement in said set acquired at a different moment in time.

17. The method of claim 11 wherein a scanning photodiode provides said measurement.

18. A method for providing sub-beam impingement intensity control from a set of sub-beams generated from a parallel process laser system and impinged upon a target, at least two of said sub-beams having an impingement separation at said target of less than about 260 microns, comprising the step of:

measuring the impingement intensity of a sub-beam to generate a sub-beam intensity measurement; and attenuating the intensity of said sub-beam responsive to said measurement.

19. The method of claim 18 wherein said attenuating step further comprises using a microfilter.

20. The method of claim 19 further comprising making said microfilter from said measurement.

21. The method of claim 18 wherein said measuring step further comprises the step of passing the sub-beam whose intensity is being measured through an aperture dimensioned to block all adjacent sub-beams from passing to impinge upon said target, said adjacent sub-beams being adjacent to the sub-beam whose intensity is being measured.

22. The method of claim 18 wherein said measuring step further comprises the step of acquiring a reference beam intensity measurement.

23. The method of claim 18 wherein said measurement is derived from a set of statistically significant measurements of the intensity of said sub-beam, each measurement in said set acquired at a different moment in time.

24. The method of claim 18 wherein said measuring step further comprises using a photodiode.

25. A method for making an inkjet nozzle, comprising the steps of:

providing a laser drilling system having a laser for generating a plurality of sub-beams for drilling holes in an inkjet nozzle foil according to a hole target pattern;

measuring the impingement intensity of each sub-beam on a target to generate a respective sub-beam intensity measurement;

using all said intensity measurements to make a microfilter;

positioning said microfilter between said pattern and said target to attenuate the intensity of each said sub-beam;

placing said foil into a position commensurate with the position of said target; and operating said laser system to drill said foil and thereby make said nozzle.

26. The method of claim 25 wherein, said measuring step further comprises passing the sub-beam whose intensity is being measured through an aperture dimensioned to block all adjacent sub-beams from passing to impinge upon said target, said adjacent sub-beams being adjacent to the sub-beam whose intensity is being measured.

27. The method of claim 25 wherein said measuring step further uses a reference beam intensity measurement.

28. The method of claim 25 wherein said measuring step derives a set of statistically significant measurements of the intensity of said sub-beam, each measurement in said set acquired at a different moment in time.

29. The method of claim 25 wherein a scanning photodiode provides said measurement.

30. A laser drilling apparatus for providing sub-beam impingement intensity control from a set of sub-beams impinged upon a target, at least two of said sub-beams having an impingement separation at said target of less than about 260 microns, comprising:

means for independently attenuating the intensity of each sub-beam in said sub-beam set in response to a measurement of the impingement intensity of that sub-beam.

31. The apparatus of claim 30 wherein said independently attenuating means is a microfilter.

32. The apparatus of claim 31 wherein said microfilter is derived from said measurement.

33. The apparatus of claim 32 further comprising a scanning photodiode for providing said measurement.

34. The apparatus of claim 33 further comprising a blocking plate having an aperture positioned to pass to said target, during measurement, the sub-beams whose intensity is being measured while at the same time blocking all adjacent sub-beams from passing to impinge upon said target, said adjacent sub-beams being adjacent to the sub-beam whose intensity is being measured.

* * * * *

UNITED STATES PATENT AND TRADEMARK OFFICE
CERTIFICATE OF CORRECTION

PATENT NO.   : 6,710,293 B2
DATED        : March 23, 2004
INVENTOR(S)  : Liu et al.

It is certified that error appears in the above-identified patent and that said Letters Patent is hereby corrected as shown below:

<u>Column 12,</u>
Line 47, "sunbeams" should be -- sub-beams --

<u>Column 14,</u>
Line 56, "sub-beams" should be -- sub-beam --

Signed and Sealed this

Sixteenth Day of November, 2004

JON W. DUDAS
*Director of the United States Patent and Trademark Office*